(12) United States Patent
Sibuet et al.

(10) Patent No.: US 10,695,591 B2
(45) Date of Patent: Jun. 30, 2020

(54) AIRCRAFT COCKPIT, ASSEMBLY COMPRISING A RESPIRATORY MASK AND A STORAGE DEVICE, AS WELL AS STORAGE METHOD AND METHOD FOR USE OF SUCH AN ASSEMBLY

(71) Applicant: Zodiac Aerotechnics, Plaisir (FR)

(72) Inventors: Jean-Philippe Sibuet, Verneuil sur Seine (FR); Olivier Potet, Palaiseau (FR); Benoît Bouchet, Paris (FR); Frédéric Berthet, Saulx Marchais (FR)

(73) Assignee: Zodiac Aerotechnics, Plaisir (FR)

( * ) Notice: Subject to any disclaimer, the term of this patent is extended or adjusted under 35 U.S.C. 154(b) by 297 days.

(21) Appl. No.: 15/764,286

(22) PCT Filed: Sep. 29, 2016

(86) PCT No.: PCT/FR2016/052499
§ 371 (c)(1),
(2) Date: Mar. 28, 2018

(87) PCT Pub. No.: WO2017/055764
PCT Pub. Date: Apr. 6, 2017

(65) Prior Publication Data
US 2018/0289989 A1 Oct. 11, 2018

(30) Foreign Application Priority Data
Sep. 29, 2015 (FR) .................................... 15 59219

(51) Int. Cl.
*A62B 7/14* (2006.01)
*A62B 25/00* (2006.01)
(Continued)

(52) U.S. Cl.
CPC ................ *A62B 7/14* (2013.01); *A62B 18/02* (2013.01); *A62B 18/084* (2013.01);
(Continued)

(58) Field of Classification Search
CPC .......... A62B 7/14; A62B 18/02; A62B 18/084; A62B 25/005; B64D 11/0689; B64D 25/00
See application file for complete search history.

(56) References Cited

U.S. PATENT DOCUMENTS 5,954,052 A 9/1999 McDonald et al.
2002/0189617 A1* 12/2002 Cordero ............... A62B 25/005
128/205.25
(Continued)

FOREIGN PATENT DOCUMENTS

WO 2012085616 6/2012

OTHER PUBLICATIONS

International Patent Application No. PCT/FR2016/052499, International Search Report and Written Opinion, dated Jan. 26, 2017.

*Primary Examiner* — Justin M Benedik
(74) *Attorney, Agent, or Firm* — Kilpatrick Townsend & Stockton LLP; Dean W. Russell

(57) ABSTRACT

Assembly intended to be arranged in an aircraft cockpit having a pressurized cabin, in order to supply a breathing gas to a crew member, said assembly comprising a respiratory mask having an oronasal face cover and a harness, the oronasal face cover having a respiratory cavity and being suitable for applying on the face of the crew member around the mouth and nose, the harness forming a loop adapted to be extended around the head of the user on a side opposite from the oronasal face cover so as to hold the oronasal face cover on the face of the user, and a storage device, said storage device comprising a base and a platform, the platform being mounted so as to be movable relative to the base between a retracted position and an extended position, the platform having a receiving surface, the receiving surface of the platform being adapted to receive the respiratory mask in a storage position where the harness holds the oronasal face (Continued)

cover against the receiving surface of the platform by encircling the platform to form a loop extending around the platform on the opposite side from the oronasal face cover, the respiratory mask being releasable from the storage device.

33 Claims, 10 Drawing Sheets

(51) Int. Cl.
*A62B 18/02* (2006.01)
*A62B 18/08* (2006.01)
*B64D 11/06* (2006.01)
*B64D 25/00* (2006.01)

(52) U.S. Cl.
CPC ........ *A62B 25/005* (2013.01); *B64D 11/0689* (2013.01); *B64D 25/00* (2013.01); *A62B 18/025* (2013.01); *B64D 2231/025* (2013.01)

(56) References Cited

U.S. PATENT DOCUMENTS

| | | | |
|---|---|---|---|
| 2003/0188989 A1* | 10/2003 | Taieb | A62B 25/005 206/527 |
| 2004/0144384 A1* | 7/2004 | Martinez | A62B 25/005 128/204.29 |
| 2013/0147239 A1 | 6/2013 | Guering | |
| 2014/0290665 A1 | 10/2014 | Libis | |

* cited by examiner

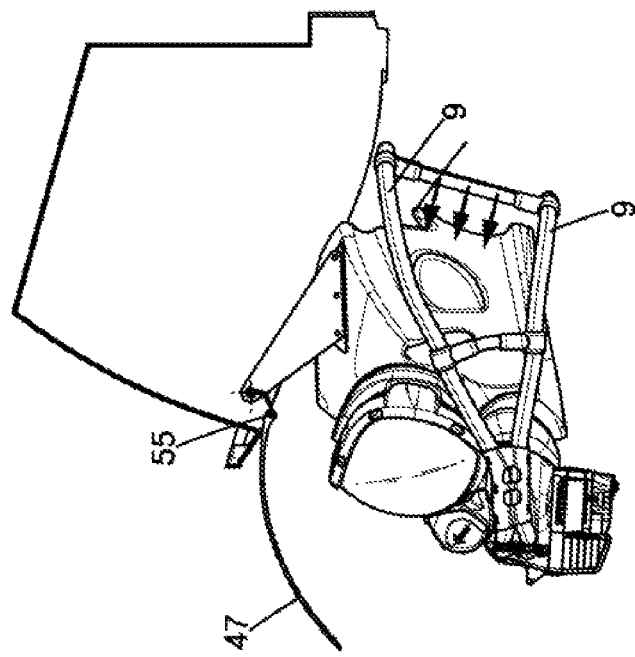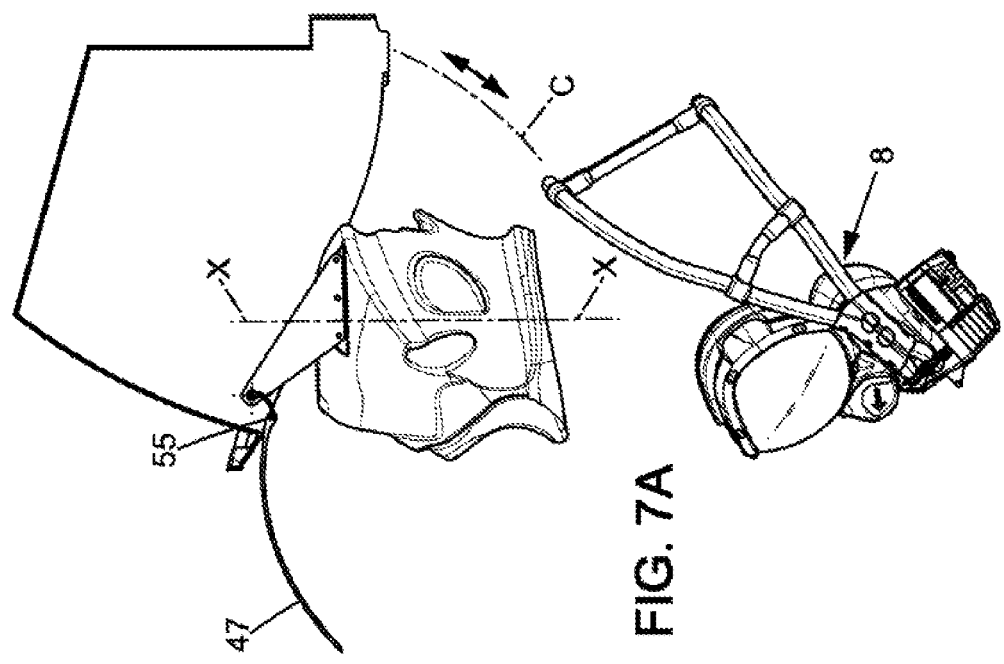

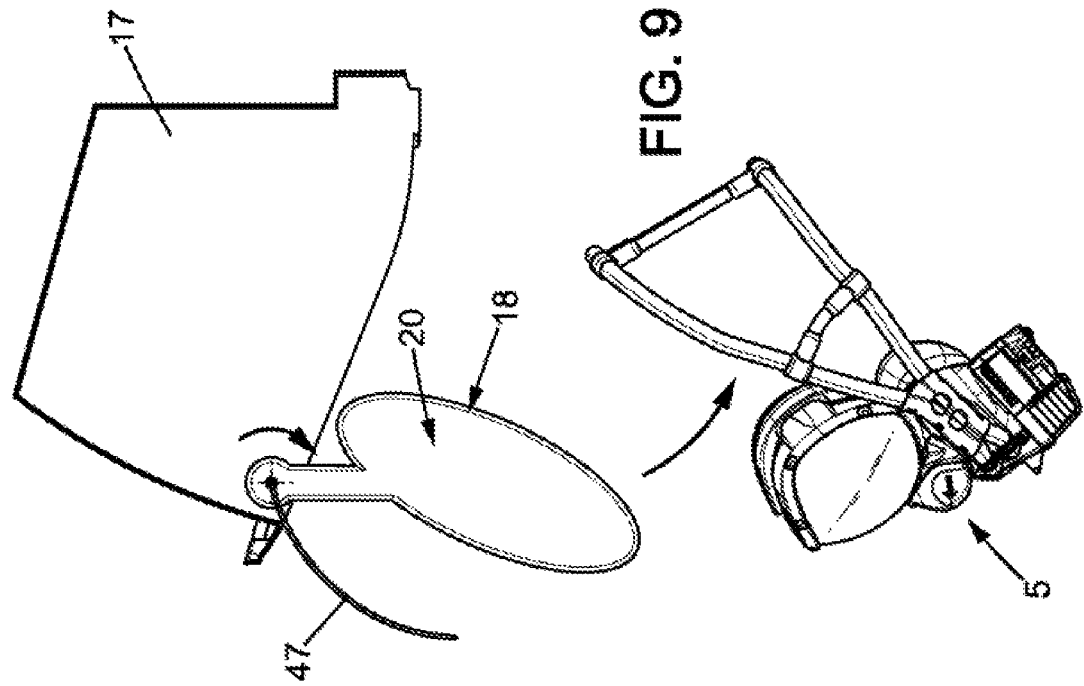
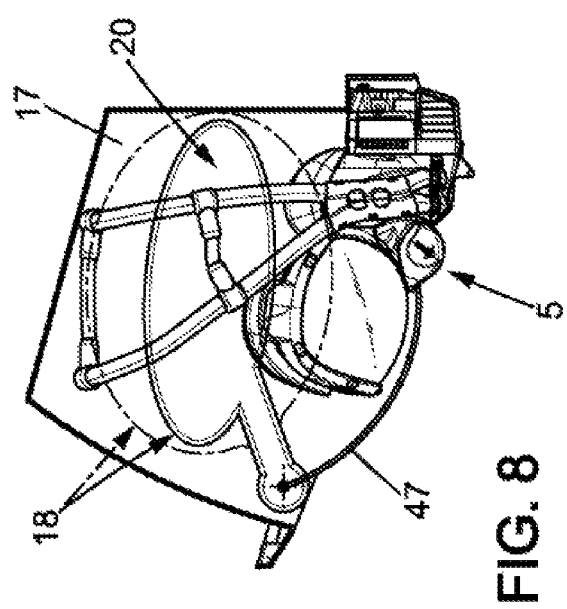

AIRCRAFT COCKPIT, ASSEMBLY COMPRISING A RESPIRATORY MASK AND A STORAGE DEVICE, AS WELL AS STORAGE METHOD AND METHOD FOR USE OF SUCH AN ASSEMBLY

CROSS-REFERENCE TO RELATED APPLICATIONS

This application is a national phase entry under 35 USC § 371 of International Application PCT/FR2016/052499 ("the '499 application"), filed on Sep. 29, 2016, which claims priority to France Application No. 1559219 ("the '219 application"), filed on Sep. 29, 2015. The '499 application and the '219 application are hereby incorporated in their entireties by this reference.

FIELD OF THE INVENTION

The invention relates to an assembly for supplying a breathing gas to a crew member of an aircraft.

The invention also relates to a method for storing such an assembly.

The invention further relates to a method for use of such an assembly.

BACKGROUND OF THE INVENTION

The invention aims to provide a solution for the storage and use of an emergency equipment supplying a breathing gas to a crew member in the event of an emergency for example. The breathing gas is supplied through a respiratory mask. The respiratory mask comprises an oronasal face cover suitable for applying on the face of the crew member around the mouth and nose. The respiratory mask also comprises a harness. This harness holds the oronasal face cover on the face of the crew member. The respiratory mask may further comprise a protective shield. The shield protects the eyes of the user from any airborne elements, particularly smoke. The shield may also support a display device.

In a storage position, the respiratory mask is arranged in a storage device located in the cabin of a commercial aircraft transporting passengers and a crew. The aircraft further comprises a pressurization device which pressurizes the cabin to enable the passengers and crew to breathe normally within the cabin.

In case of depressurization, the user of the emergency equipment, which is usually the pilot or co-pilot, grabs the respiratory mask which is located in the storage device. The user then places the respiratory mask around his head in order to breathe through the respiratory mask, which thus supplies him with breathing gas.

A storage device for a respiratory mask is therefore important, in order to protect the respiratory mask when not in use. Such a storage device must also be placed in a predefined position, to allow a crew member to quickly grasp the mask and position it on his face.

This is why the storage devices are sometimes placed in the dashboard of the cockpit, within the reach of the pilot or co-pilot. With the same reasoning, the storage devices may be located up above, near the pilot or co-pilot.

When an emergency condition is detected, the user has less than five seconds to grab the mask and position it on his face. It is therefore important for the harness to be quickly and easily deployed when it is stored in its storage device.

To ensure proper deployment of the respiratory mask, it is equally important that the respiratory device be appropriately stored in the storage device. This operation is sometimes tricky and unintuitive, however.

Thus, an object of the invention is to provide a storage device and a method for the storage and use of this device which enables intuitive storage of the respiratory mask and quick and easy deployment of the respiratory mask.

DESCRIPTION OF THE INVENTION

To this end, the invention relates to an assembly intended in particular to be arranged in a cockpit of an aircraft having a pressurized cabin in order to supply a breathing gas to a crew member, said assembly comprising a respiratory mask having an oronasal face cover and a harness, the oronasal face cover having a respiratory cavity and being suitable for applying on the face of the crew member around the mouth and nose, the harness forming a loop adapted to be extended around the head of the user on a side opposite from the oronasal face cover so as to hold the oronasal face cover on the face of the user, and a storage device, said storage device comprising a base and a storage platform (stud), the platform being mounted so as to be movable relative to the base between a retracted position and an extended position, the platform having a receiving surface, the receiving surface of the platform being adapted to receive the respiratory mask in a storage position where the harness holds the oronasal face cover against the receiving surface of the platform by encircling the platform to form a loop extending around the platform on the opposite side from the oronasal face cover, the respiratory mask being releasable from the storage device.

The storage device so created facilitates the operation of storing the respiratory mask in the storage device. The platform also allows presenting the respiratory mask in such a way that it is easily grasped by the user during usage conditions. In addition, the receiving surface provided on the platform enables the respiratory mask to be always in the same positioning in the storage device, and prevents the harness from catching or becoming entangled in the respiratory cavity formed by the respiratory mask.

In various embodiments of the assembly according to the invention, one or more of the following arrangements may further be used:

- the receiving surface is peripheral and extends around the longitudinal axis;
- the harness is expandable, the harness having a deployed state and a retracted state;
- the harness forms a loop adapted to be extended around the head of the user on the opposite side from the oronasal face cover so as to hold the oronasal face cover on the face of the user when the harness is in the retracted state, and in the storage position the harness is in the retracted state;
- the platform extends along a longitudinal axis between a connecting end and a free end, and is connected to the base at the connecting end, and the respiratory mask is releasable from the storage device when the harness is in the deployed state by movement away from the platform on the side opposite from the connecting end. The respiratory mask thus fits snugly onto the platform. The respiratory mask is therefore held in position for proper storage. When the harness is deployed, the respiratory mask no longer fits snugly on the platform. It is then easier to grab the respiratory mask from the storage device.
- the platform has a generally cylindrical shape extending around the longitudinal axis. The cylindrical shape of

- the platform offers the advantage of being generally complementary to the loop formed by the harness. This shape serves as a positioning key and allows more intuitive storage of the respiratory mask in the storage device.
- the platform has a groove on its peripheral receiving surface which receives the harness in the storage position. The presence of such a groove improves the positioning of the harness around the platform, which occurs intuitively;
- the platform has the general shape of a human head. The shape of a human head is the most intuitive means for storing the respiratory mask.
- the platform is extendable between a first state where the platform is holding the harness and a second state where the platform releases the harness, and the respiratory mask is releasable from the storage device when the platform is in the retracted state;
- the platform has an inflatable casing;
- the base has a housing;
- when the respiratory mask is in the storage position and the platform is in the retracted position, the platform and respiratory mask are at least partially housed in the housing;
- when the respiratory mask is in the storage position and the platform is in the retracted position, the major portion of the platform is inserted into the housing;
- the harness comprises an elastic tubular device having an elongate internal cavity, and the elastic tubular device is adapted to elongate according to the pressure in the internal cavity of the elastic tubular device so as to enable the crew member to insert his head into the loop formed by the harness when the harness is in the deployed state;
- the platform is mounted on the base so as to rotate between the retracted position and the extended position;
- the platform pivots between 45 and 135 degrees between the retracted position and the extended position relative to the base; in other words, the amount of rotation of the platform relative to the base between the retracted position and the extended position is between 45 and 135 degrees;
- the platform is urged towards the extended position by gravity. No particular movement system is therefore required to drive the platform towards the extended position;
- the platform is held in the retracted position by a retaining device. The device secures the retracted position of the platform;
- the retaining device holding the platform in the retracted position is a device operating by magnetic attraction. This type of magnetic attraction device has the advantage of being simple to implement;
- the device operating by magnetic attraction comprises a retaining magnet and a magnetizable or magnetic element, the magnetizable or magnetic element being in immediate proximity to the retaining magnet in the retracted position, one among the retaining magnet and the magnetizable or magnetic element being bonded to the base and the other among the retaining magnet and the magnetizable or magnetic element being bonded to the platform;
- the retaining magnet is an electromagnet. The use of an electromagnet enables linking the deployment of the platform, and thus the release of the respiratory mask, to the avionics of the aircraft. The respiratory mask release signal is therefore issued automatically, for example in a critical situation (low cabin pressure or detection of smoke for example). Automatic release of the respiratory mask also has the advantage of encouraging the user to grasp the respiratory mask and therefore to wear it when appropriate.
- the retaining device comprises an abutment, the abutment holding the platform in the retracted position.

The invention also relates to an aircraft cockpit comprising a seat and an assembly intended in particular to be arranged in a cockpit of an aircraft having a pressurized cabin in order to supply breathing gas to a crew member, wherein the assembly is arranged substantially above the seat but laterally offset relative to the seat by 25 centimeters to 75 centimeters. This type of arrangement allows optimum protection of the respiratory mask. When the respiratory mask is placed up high, it is less exposed to the various damaging factors that may be encountered, such as spillage of contaminants such as beverages or even the possibility of breakage.

The invention further relates to a method for storing an assembly intended in particular to be arranged in a cockpit of an aircraft having a pressurized cabin in order to supply breathing gas to a crew member, said assembly comprising a respiratory mask and a storage device, the respiratory mask comprising a harness forming a loop adapted to be extended around the head of the user, the storage device comprising a base and a storage platform, the platform being mounted so as to be movable relative to the base between a retracted position and an extended position, wherein in said method:

a) the platform is placed in the extended position, b) respiratory mask is brought to a storage position against a receiving surface of the platform while positioning the loop of the harness around the platform, on a side opposite from the oronasal face cover, c) the oronasal face cover is held against the receiving surface of the platform while snugly fitting the harness on the platform, then d) the platform is brought to the retracted position.

In various embodiments of the storage method according to the invention, one or more of the following steps may also be applied:
- the harness is expandable and has a deployed state and a retracted state, and prior to step c) the harness is brought to the deployed state;
- during step c) the harness is brought to the retracted state;
- the platform is extendable between a first state where the platform is holding the harness and a second state where the platform releases the harness, and prior to step c) the platform is brought to the second state;
- during step c) the platform is in the first state;
- the platform extends along a longitudinal axis between a connecting end and a free end, and is connected to the base at the connecting end, and during step b) the harness is moved relative to the platform towards the connecting end in order to position the loop of the harness around the platform.

The invention further relates to a method for the use of an assembly intended in particular to be arranged in a cockpit of an aircraft having a pressurized cabin in order to supply a breathing gas to a crew member, said assembly comprising a respiratory mask and a storage device, the respiratory mask comprising a harness forming a loop adapted to be extended around the head of the user, the storage device comprising a base and a storage platform, the platform being mounted so as to be movable relative to the base between a retracted position and an extended position, wherein in said method:

a) the respiratory mask being in a storage position against a receiving surface of the platform, and the loop of the harness extending around the platform on a side opposite from the oronasal face cover, the platform is moved from the retracted position to the extended position, b) the oronasal face cover is held against the receiving surface of the platform, then c) the respiratory mask is released from the storage device.

In various embodiments of the method for use according to the invention, one or more of the following steps may further be used:

- the harness is expandable and has a deployed state and a retracted state, and prior to step a) the harness is brought to the retracted state;
- during step c) the harness is brought to the deployed state;
- the platform is extendable between a first state where the platform is holding the harness and a second state where the platform releases the harness, and prior to step a) the platform is brought to the second state;
- during step c) the platform is in the first state;
- the platform extends along a longitudinal axis between a connecting end and a free end, and is connected to the base at the connecting end, and during step c) the harness is moved away from the platform on the side opposite from the connecting end in order to release the respiratory mask from the platform.

Of course, the various abovementioned features, variants, and/or embodiments of the invention can be associated with each other in various combinations to the extent that they are not incompatible or mutually exclusive of one another.

BRIEF DESCRIPTION OF FIGURES

Other features and advantages of the invention will be apparent from the following detailed description, with reference to the accompanying drawings in which:

FIGS. 7A, 7B, 7C and 7D illustrate four steps in moving the storage device between a retracted position and an extended position, FIG. 8 shows an assembly according to a third embodiment of the invention, the storage device being in the retracted position, FIG. 9 shows the assembly according to the third embodiment, the storage device being in the extended position.

DETAILED DESCRIPTION OF THE INVENTION

Figure 1:
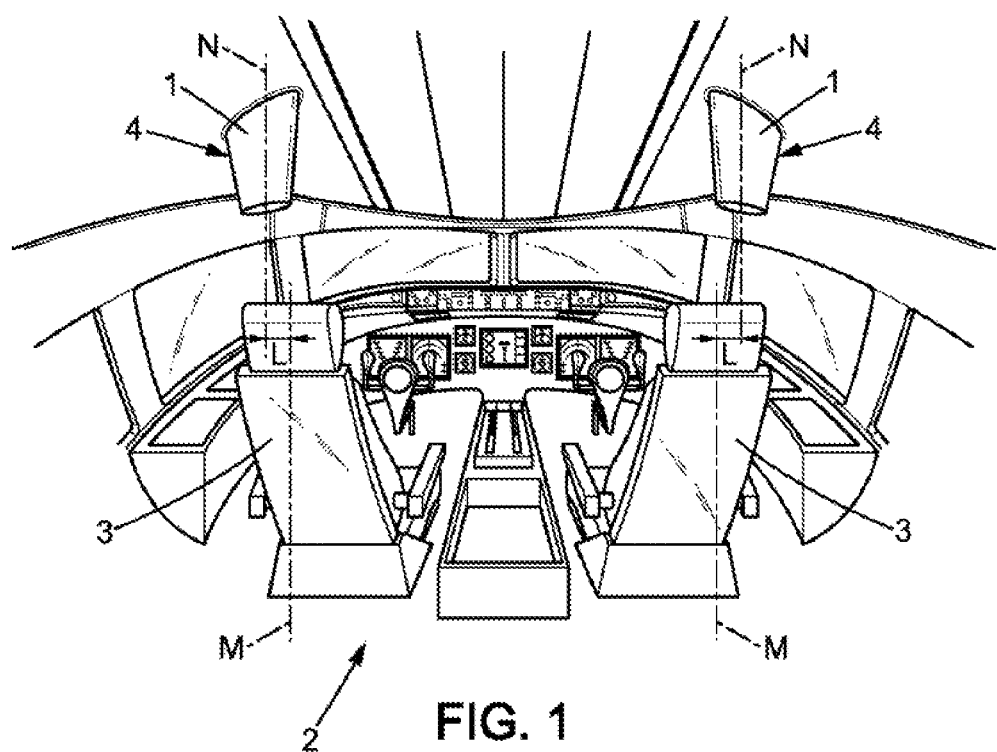
FIG. 1 is an overall view of a cockpit equipped with two assemblies according to the invention.

FIG. 1 illustrates an overview of several storage devices 1 installed in a pressurized cabin of an aircraft cockpit 2. More specifically, FIG. 1 shows two assemblies 4. Each assembly 4 comprises a storage device 1, each intended for a pilot or a copilot. Each storage device 1 is positioned above a seat 3. More precisely, each storage device 1 is arranged substantially above the seat 3, but offset laterally by a distance L relative to the seat. Each seat 3 is substantially symmetrical with respect to a first midplane M and each storage device 1 is also substantially symmetrical with respect to a second midplane N. The distance L corresponds to the distance between the midplane M of the seat 3 and the midplane N of the corresponding storage device 1. The lateral distance L between the seat 3 and the storage device 1 may be between 25 centimeters and 75 centimeters. As illustrated in FIG. 1, the storage device 1 corresponding to the left seat is laterally offset towards the left of the seat by the distance L. Similarly, the storage device 1 corresponding to the right seat is laterally offset towards the right of the seat by the distance L. Such an arrangement offers the advantage of protecting the storage device 1 from damage that may occur. The storage device 1 is thus protected from splashing liquids for example.

Figure 2:
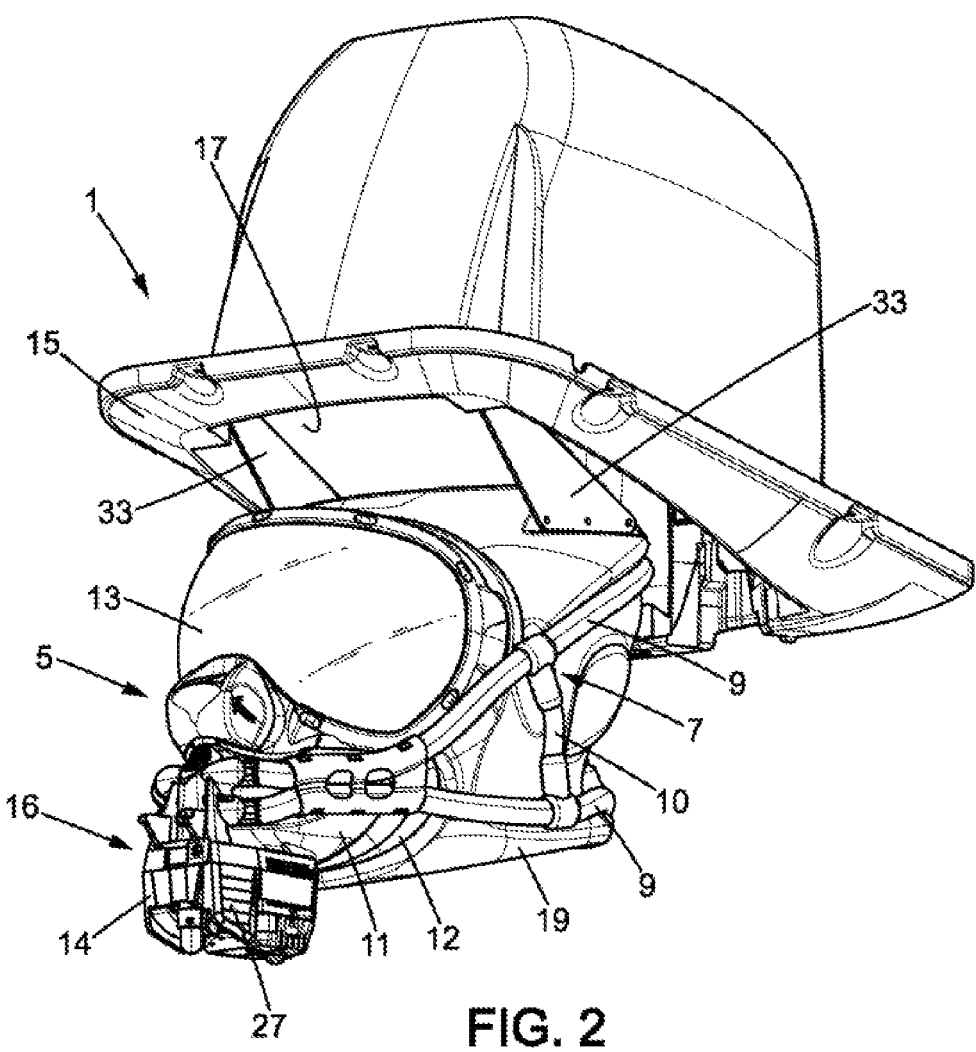
FIG. 2 is a perspective view of a first embodiment of an assembly according to the invention, comprising a respiratory mask and a storage device.
Figure 3:
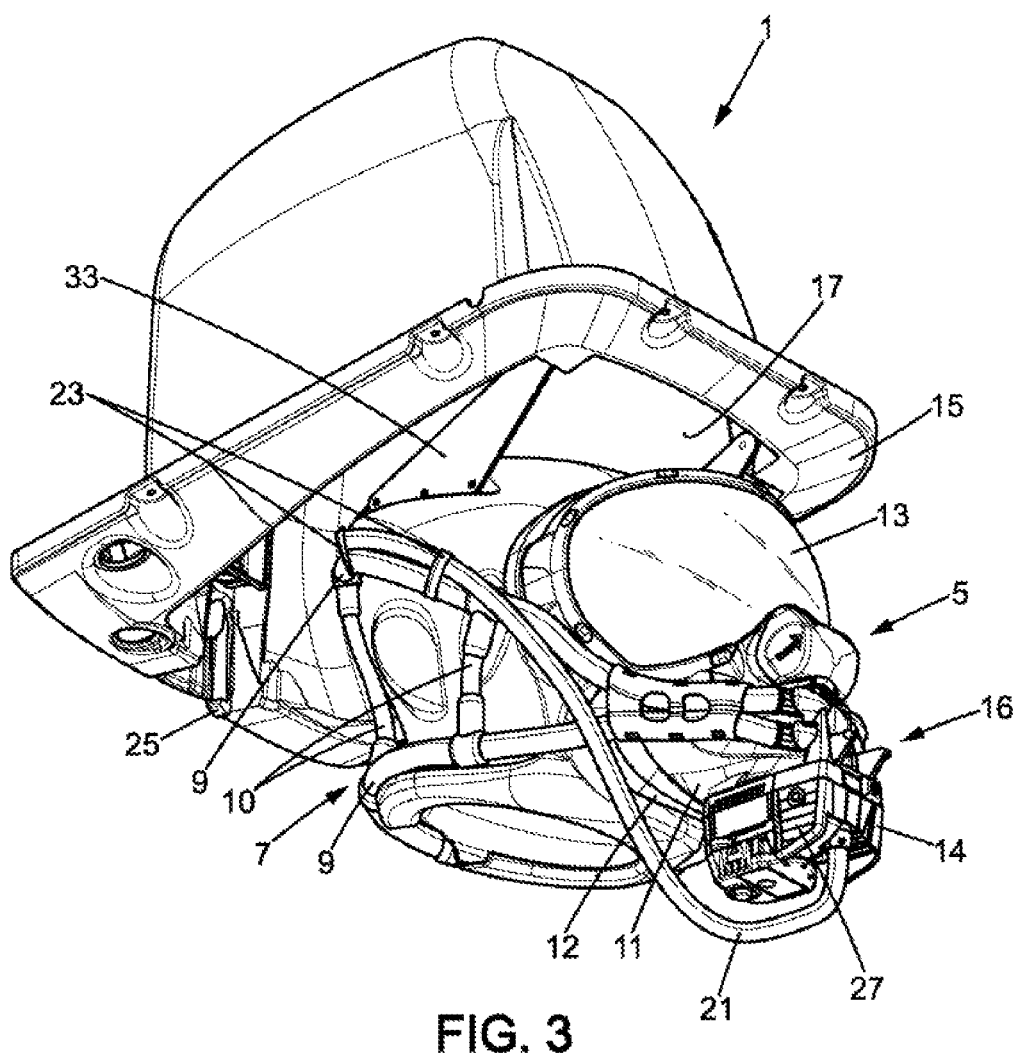
FIG. 3 is a perspective view of the assembly illustrated in FIG. 2, from a different angle.

The storage device 1 essentially comprises a respiratory mask 5, a platform (stud) 19, a base 15, and a housing 17. As illustrated in FIGS. 2 and 3, the respiratory mask 5 essentially comprises an oronasal face cover 11 and a harness 7. The oronasal face cover 11 has a peripheral edge 12 defining a breathing cavity 8 within which the user breathes in and out. The peripheral edge 12 of the oronasal face cover 11 is suitable for applying on the face of the user. The respiratory mask 5 also comprises a protective shield 13. The shield 13 protects the eyes of the user from airborne elements, particularly smoke. In addition, the respiratory mask 5 comprises a rigid support 16. In the embodiment illustrated in FIGS. 2 and 3, the rigid support 16 serves as a housing containing a regulator 14. The regulator 14 allows delivering the breathing gas on demand. For this purpose, the regulator 14 comprises a lever 27 on one of its side portions. The lever 27 serves as a control knob for the supply of breathing gas. The respiratory mask 5 is supplied with breathing gas via a supply hose 21. As illustrated in FIG. 3, the supply hose 21 extends from the area of the regulator 14, to the housing 17 up above the storage device 1. To maintain the position of the supply hose 21 along the harness 7, the supply hose 21 is held on the harness 7. It may for example be held by hose clips 23. This type of overhead arrangement of the supply hose 21 means the supply hose 21 is not an impediment when the respiratory mask 5 worn by a user. It also has the advantage of reducing the weight suspended from the support and pulling downward on the user's chin, in comparison to cases where the supply hose 21 is fixed to the regulator 14 and extends downward to a storage device 1 located in front of the user.

Figure 10:
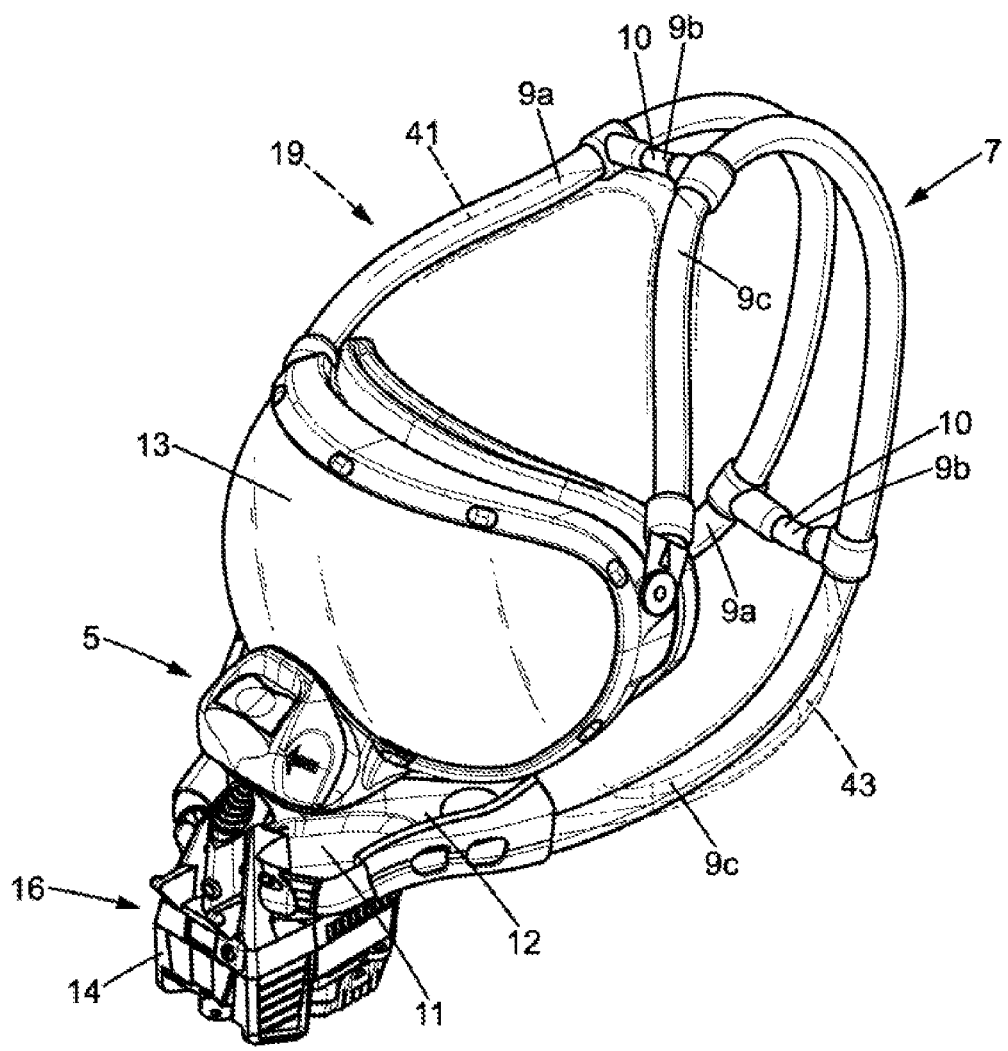
FIG. 10 illustrates a perspective view of the assembly according to a fourth embodiment of the invention.

The harness 7 also comprises an elastic tubular device. The elastic tubular device forms at least one loop 9 adapted to extend around the head of a user, along the circumference. In the embodiment illustrated in FIGS. 2 and 3, the harness 7 forms two loops 9. The two loops 9 are held apart by flexible spacer elements 10. The flexible elements 10 extend transversely between the two loops 9. In other words, the flexible elements 10 extend generally vertically when the respiratory mask 5 is in the operating state. As shown in FIG. 10, it is also possible to provide a harness in which each of the two loops 9 is formed by a portion that is not part of the elastic tubular device. More specifically, each loop 9 comprises a first portion 9a, a second portion 9b, and a third portion 9c. Portion 9b corresponds to the flexible element 10, which is not part of the elastic tubular device. Furthermore, in this embodiment as shown in FIG. 10, the flexible elements 10 extend horizontally when the respiratory mask 5 is in the operating state. According to one embodiment, the harness 7 is expandable. It has a deployed state and a retracted state. The elastic tubular device is thus adapted to elongate according to the pressure in its internal cavity, so as to allow the crew member to insert his head into the loops formed by the harness.

Figure 4:
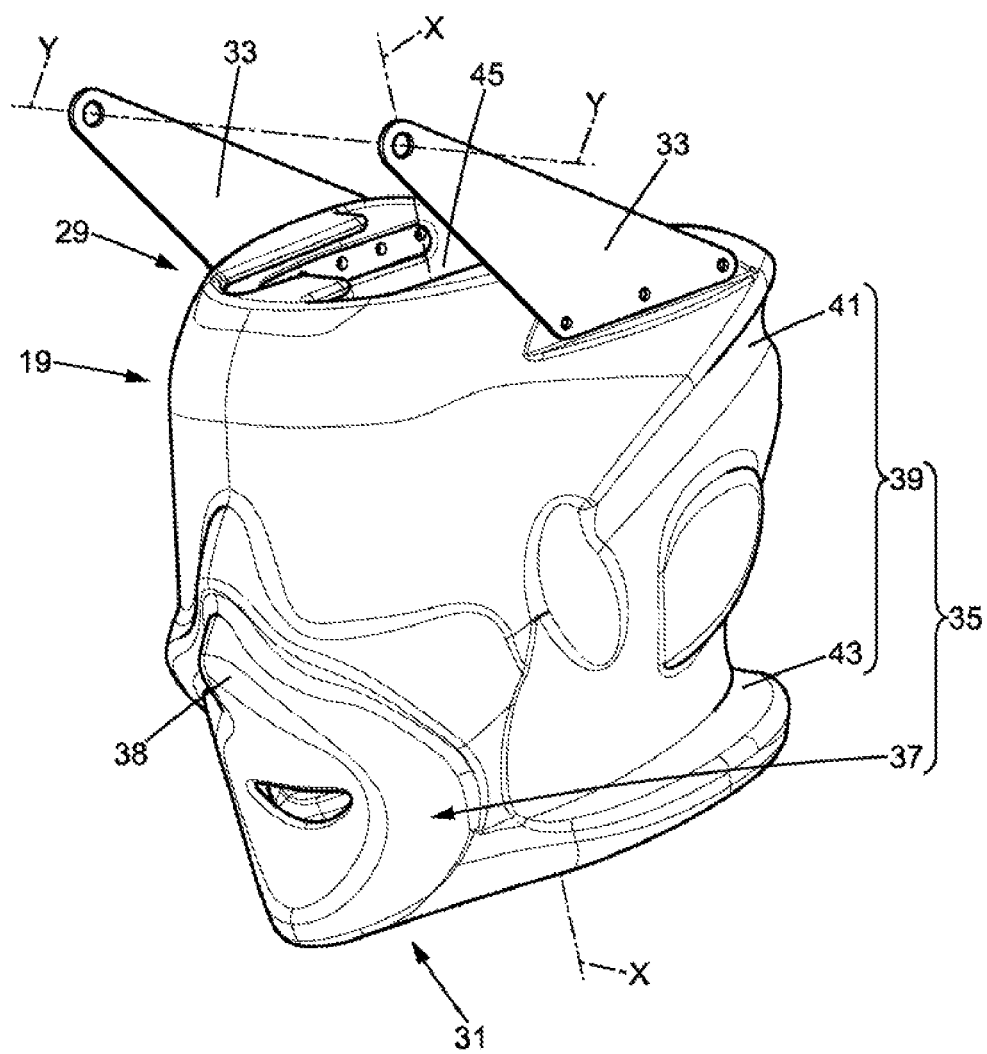
FIG. 4 illustrates an enlargement of a platform of the storage device as shown in FIG. 2.

As illustrated in FIG. 2, the storage device 1 also comprises a base 15. The base 15 defines a housing 17. The storage device 1 further comprises a storage platform 19. FIG. 4 shows a detailed view of the platform 19. In this figure, the platform is represented in isolation from the rest of the storage device 1. As shown in FIG. 4, the platform 19 is cylindrical in shape. In general, the shape of the platform 19 is that of a human head. This shape has the advantage of being an intuitive way of storing the respiratory mask 5 on the platform. It extends along a longitudinal axis X, between a connecting end 29 and a free end 31. The platform 19 is connected to the base 15 at the connecting end 29. The storage device 1 further comprises two connecting tabs 33. The connecting tabs 33 are fixed to the platform 19, near the connecting end 29. The connecting tabs 33 are arranged one on either side of the platform 19. The connecting tabs 33 are mounted so as to rotate on the base 15 about an axis of rotation Y. These connecting tabs 33 connect the platform 19 to the base 15. The platform 19 is thus able to rotate on the base 15, about the axis of rotation Y, between a retracted position and an extended position. The axis of rotation Y is substantially perpendicular to the longitudinal axis X and extends substantially parallel to the cockpit ceiling. The platform further comprises a receiving surface 35. The receiving surface 35 is provided for receiving the respiratory mask 5 when the mask is stored in the storage device 14. The receiving surface 35 is peripheral. It extends around the longitudinal axis X. As shown in FIG. 4, the receiving surface comprises a front portion 37. The front portion 37 is provided for receiving the oronasal face cover 11 of the respiratory mask 5. This front portion 37 comprises a protrusion 38. The protrusion 38 has the general shape of a mouth and nose, at least at the base. The peripheral edge 12 of the oronasal face cover 11 is thus able to engage with the projection 38 when the respiratory mask 5 is in the storage position. In addition, the shape of the protrusion 38 closely corresponds to that of the peripheral edge 12. Moreover, the receiving surface 35 has a first groove 41 and a second groove 43. The first and second grooves 41, 43 are arranged peripherally around the platform 19. The first and second grooves 41, 43 are on the side opposite from the front portion 37. The second groove 43 is offset relative to the first groove 41 along the direction of the longitudinal axis X. The first groove 41 is closer to the connecting end 29 than the second groove 43. The second groove is thus closer to the free end 31 than the first groove 41. The first and second grooves 41, 43 are used to receive the loops 9 of the respiratory mask 5. Each of the loops 9 will thus be respectively received in one among the first and second grooves 41, 43. These first and second grooves 41, 43 thereby improve the positioning 7 of the harness around the platform 19, and hold it in position around this platform 19. In addition, the platform 19 has a storage cavity 45 for the supply hose 21. The storage surface 45 is located in the upper portion of the platform 19 along the longitudinal axis X. More specifically, the storage surface 45 is close to the connecting end 29. This storage surface 45 is used to receive the supply hose 21 when the respiratory mask 5 is stored in the storage device 1.

Figure 5:
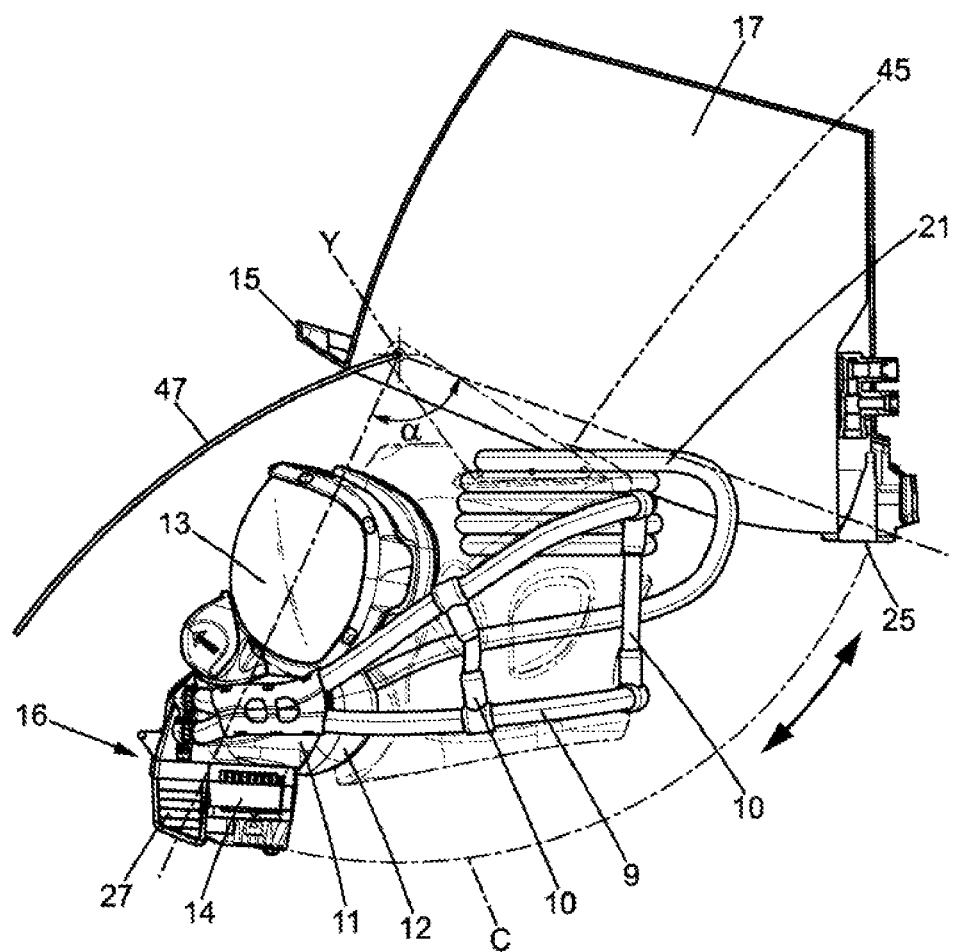
FIG. 5 illustrates a plan view of the assembly of the invention comprising a respiratory mask and a storage device.
Figure 6A:
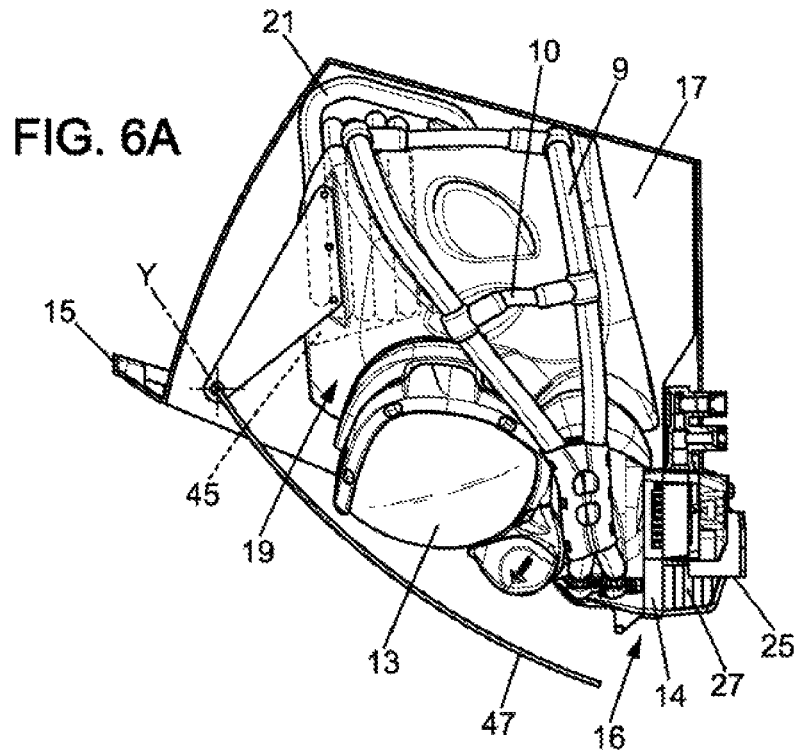
FIG. 6A illustrates the assembly according to the first embodiment of the invention.
Figure 6B:
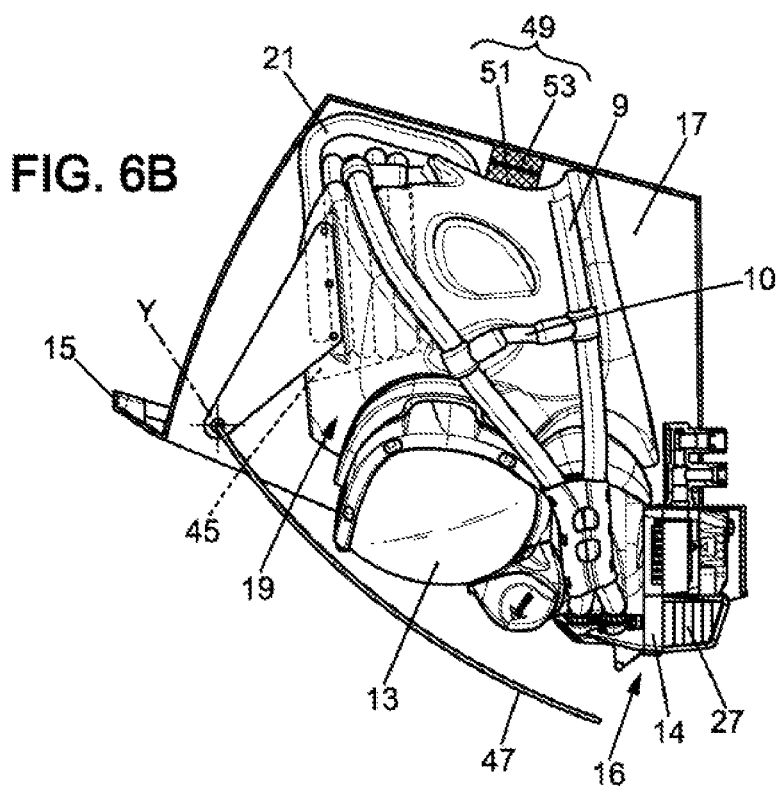
FIG. 6B illustrates the assembly according to a second embodiment of the invention.

This is illustrated in more detail in FIG. 5. In this figure, the storage cavity 45 receives the supply hose 21. Specifically, a portion of the supply hose 21, meaning an intermediate portion which is not fixed to the harness 7, is stored in this storage cavity 45. The storage may occur by coiling the supply hose 21 as is shown in FIG. 5. This type of storage reduces the space occupied by the supply hose 21 during storage of the respiratory mask 5. In addition, FIGS. 6A and 6B illustrate the respiratory mask 5 positioned around the platform 19, when these are in the retracted position. The assembly consisting of the respiratory mask 5 and the platform 19 is moved from the extended position, seen in FIG. 5, to the retracted position shown in FIG. 6A or 6B, and the reverse, by rotation on the base 15 about the axis of rotation Y, between the retracted position and the extended position. The movement of the assembly then describes a circular arc C. According to this embodiment, the platform 19 pivots 45 to 135 degrees between the retracted position and the extended position relative to the base 15. In other words, as shown in FIG. 5, the platform 19 pivots, relative to the base 15, between the retracted position and the extended position over an angle α of between 45 and 135 degrees. More specifically, in the illustrated embodiment, the platform 19 rotates about 90 degrees relative to the base 15. When the assembly consisting of the respiratory mask 5 and the platform 19 is in the retracted position, the major portion of the platform 19 is inserted into the housing 17. The respiratory mask 5 is at least partially received in the housing 17. The portion of the respiratory mask 5 comprising the regulator 14 extends beyond the housing 17. When the assembly consisting of the respiratory mask 5 and the platform 19 is in the retracted position, gravity urges it to pivot about the axis of rotation Y and thus move into the extended position. It is therefore necessary to provide a retaining device 49 for holding the assembly in the retracted position. In FIG. 6B, the retaining device 49 is a device operating by magnetic attraction. It comprises a magnetizable element 51 and a retaining element 53. The magnetizable element 51 and the retaining element 53 are in immediate proximity to one another in the retracted position. In this embodiment illustrated in FIG. 6B, the magnetizable element 51 is fixed to the platform 19 while the retaining element 53 is fixed to the housing 17. However, in another embodiment, it is possible to reverse the positions of the two elements forming the retaining device 49 operating by magnetic attraction. Thus, the retaining element 53 may be integral to the platform 19 and the magnetizable element 51 integral to the housing 17. Regardless of the positions of the retaining element 53 and magnetizable element 51, it is advantageous for the retaining element 53 to be an electromagnet. This electromagnet can thus be connected to the avionics and control the release of the platform 19 according to navigational conditions. Thus, the platform 19 can move to the extended position for example upon detection of smoke or depressurization. This automatic release enables placing the respiratory mask 5 readily accessible to the user so that he can put on the respiratory mask as quickly as possible in case of emergency (pressurization failure, depressurization, smoke, etc.). Of course, the user can also place the platform 19 in the extended position, particularly for preventive use of the respiratory mask, either by pulling on the platform 19 to overcome the force of the electromagnet or by using a manual control button (not shown) or similar. According to another embodiment, the retaining element 53 can be a simple magnet. It is then sufficient for the user to pull on the assembly to release the platform 19 from the housing 17. The retaining force of the magnet in this case is designed to withstand the weight of the assembly which would otherwise fall under the effect of gravity. However, the magnet releases when the user pulls on the assembly. In yet another embodiment, the magnetizable element 51 could be replaced by a permanent magnet, an electromagnet, or any other magnetic element, or an electromagnet could be magnetically coupled to the magnetizable element 51 to create a magnetic field opposing the magnetic field of the permanent magnet formed by the retaining element 53 in order to release the platform.

Alternatively, the retaining device 49 could be different, the retaining element 53 and the magnetizable element 51 could be replaced by a hook and a lip or similar element adapted to engage with the hook, forming a mechanical stop holding the platform 19 in the retracted position. An actuator acting on the hook to move it away from the lip would preferably be connected to the avionics in order to control the release of the platform 19 according to navigational conditions.

FIG. 6A illustrates another alternative for holding the assembly in the retracted position. In this embodiment, this is partly achieved by means of an abutment 25. The abutment 25, also visible in FIG. 3, is designed as a clip grip. The lever 27 of the regulator 14 clips onto this abutment 25. As a result, the clipping of the lever 27 and abutment 25 holds the respiratory mask 5 and platform 19 in the retracted position. For further details of the engagement between the abutment 25 and the lever 27, one can refer to patent application WO2012/085616 A1.

The storage device 1 may further comprise a door 47, as illustrated in FIGS. 5, 6A and 6B. The role of this door 47 is to protect the respiratory mask 5 when it is stored in the storage device 1. This door 47 thus protects the shield 13 of the respiratory mask 5. Alternatively, it is possible to provide a larger door covering most or all of the housing 17. The movement of the door 47 relative to the base 15 is controlled by a connecting rod 55, visible in FIGS. 7A, 7B, 7C and 7D. According to another embodiment, the storage device 1 comprises two connecting rods 55, each associated with a fastening tab 33.

According to a third embodiment, the platform 19 is stretchable. In this case, the platform 19 may be similar to a balloon which is inflatable or deflatable depending on the storage action desired. As shown in FIGS. 8 and 9, the platform 19 comprises a casing 18 and a rigid core 20. The casing 18 is inflatable. The respiratory mask 5 is thus held in the storage device 1 by its harness 7, solely by the rigid core 21. In general, the advantage of such a stretchable support is to reduce the overall thickness of the platform 19 and thus reduce the size of the storage device 1.

Figure 7D:
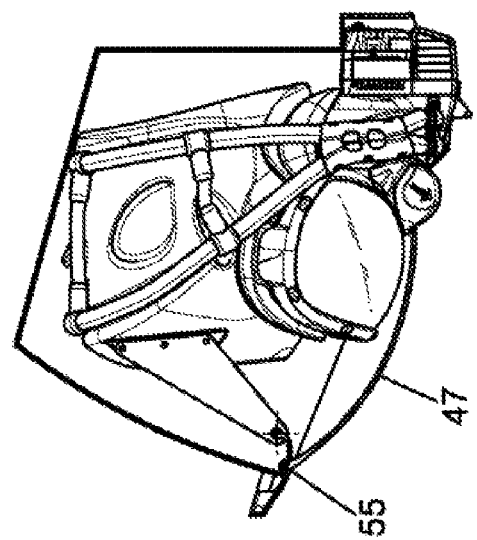
Figure 7C:
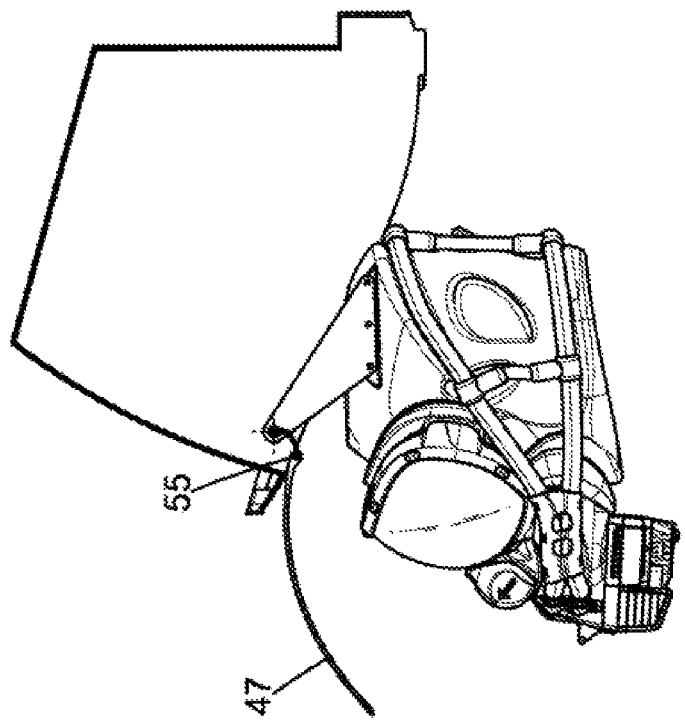

The methods for the storage and use of the storage device 1 according to the invention will now be described with reference to FIGS. 7A, 7B, 7C and 7D. When the user grasps the respiratory mask 5 by the rigid support 16, he actuates the lever 27 enabling the harness 7 to inflate. The harness 7 then moves from its retracted configuration to its deployed configuration. In this configuration, the total length of the harness 7 is thus greater than its length when at rest. Thus, the loops 9 formed by the harness 7 and provided for insertion of the user's head, are larger than those formed when at rest. The respiratory mask 5 is then placed in position around the platform 19 (FIG. 7A). To do so, the harness 7 is placed around the platform 19 via its free end 31. The passage of the harness 7 around the platform 19 is greatly facilitated by the dimensions of the harness 7, which in this step is deployed. Once the respiratory mask is in place around the platform 19, the harness is retracted (FIG. 7B). During this step, the user releases the pressure exerted on the lever 17, which allows the harness 7 to retract. During this step, the oronasal face cover 11 is positioned against the front portion 37 of the receiving surface 35. Deflation of the harness 7 thus permits the harness 7 to retract around the platform 19. The harness 7 thus fits snugly on the platform 19. The first and second grooves 41, 43 serve to guide the harness 7 as it retracts. Once the harness 7 is fully retracted (FIG. 7C), it is positioned around the platform 19 while fitting into the first and second grooves 41, 43. The presence of these first and second grooves 41, 43, serving to guide the harness 7 as it retracts, always guide it to the same area. However, such grooves 41, 43 are not essential to the invention. It is quite possible to place the respiratory mask 5 around the platform 19 without the harness fitting into grooves 41, 43. In this case, the harness 7 is held around the platform by the pressure exerted between the peripheral edge of the oronasal face cover and the protrusion 38. Next, the user pushes on the assembly comprising the platform 19 and the respiratory mask 5. The platform 19 thus pivots about its pivot axis Y. Lastly, the platform 19 and the respiratory mask 5 are received in the housing 17. The retracted position of the assembly is maintained by the retaining device 49, 25. The door 47 follows the movement of the platform 19. In the retracted position, the door is therefore near the respiratory mask 5. The door 47 thus protects the respiratory mask 5.

Conversely, when the surrounding conditions so require, the platform 19 is released from the retaining device 49. Gravity causes the platform 19 to fall while pivoting about its axis of rotation Y. The door 47 is driven by the movement of the platform 19. When the platform 19 pivots to the deployed position, the door 47 is moved away. In a second step, the respiratory mask 5 is removed from the platform 19. To remove the respiratory mask 5 from the platform 19, the harness 7 is first inflated. It is thus in the deployed position. Then the user pulls on the respiratory mask 5, in a movement starting from the free end 31 of the platform 19 and in the direction away from end 29. This movement is therefore substantially along the longitudinal axis X. The respiratory mask 5 is thus freed from the platform 19. The user can send the platform 19 back into the housing 17, by pushing it. As the platform 19 and respiratory mask 5 are two independent elements, it is possible to place the platform 19 in the retracted position when it is not encircled by the respiratory mask 5.

According to the third embodiment (FIGS. 8 and 9), when the respiratory mask 5 is in place around the platform 19, the platform 19 is in a first state where the platform 19 holds the harness 7, as is indicated by a dot-and-dash line (sometimes referred to as a phantom line) in FIG. 8. Conversely, when the respiratory mask 5 is to be removed or placed around the platform, the platform 19 is in a retracted second state where the platform 19 releases the harness 7 (solid line in FIGS. 8 and 9). The first state of the platform can thus be likened to the platform being inflated and the second state can thus be likened to the platform being deflated.

According to a variant (not shown) which we essentially differentiate from the embodiment illustrated in FIGS. 8 and 9, the platform may comprise at least two movable parts instead of an inflatable balloon. In the expanded state, the moving parts are moved apart from one another other. In the retracted state, the moving parts are moved closer to one another.

Of course, the invention is not limited to the illustrated embodiments provided for indicative and non-limiting purposes. Thus, although such is not preferred, the platform could be movable in translation relative to the base. In addition, the axis of rotation Y could be movable in translation relative to the base 15.

In addition, in the illustrated embodiments, the respiratory mask 5 comprises a protective shield 13 and an oronasal face cover 11 separate from the oronasal face cover 11, the shield 13 being in particular releasable relative to the oronasal face cover 11. Alternatively, the shield 13 could be fixed relative to the oronasal face cover 11. According to another variant, the shield 13 could be integrated into the oronasal face cover 11, forming a mask usually referred to as "full face", the respiratory cavity 8 within which the user breathes in and out also extending around the user's eyes.

Furthermore, the platform 19 may have a shape other than that illustrated, in particular a substantially spherical shape.

The invention claimed is:

1. Assembly intended to be arranged in a cockpit of an aircraft having a pressurized cabin in order to supply a breathing gas to a crew member, said assembly comprising:
   a respiratory mask having an oronasal face cover and a harness, the oronasal face cover having a respiratory cavity and being suitable for applying on the face of crew member around the mouth and nose, the harness forming a loop adapted to be extended around the head of the user on a side opposite from the oronasal face cover so as to hold the oronasal face cover on the face of the user, and
   a storage device, said storage device comprising a base and a platform, the platform being mounted so as to be movable relative to the base between a retracted position and an extended position, the platform having a receiving surface, the receiving surface of the platform being adapted to receive the respiratory mask in a storage position where the harness holds the oronasal face cover against the receiving surface of the platform by encircling the platform to form a loop extending around the platform on the opposite side from the oronasal face cover, the respiratory mask being releasable from the storage device.

2. Assembly according to claim 1, wherein
   the receiving surface is peripheral,
   the harness is expandable, the harness having a deployed state and a retracted state,
   the harness forms a loop adapted to be extended around the head of the user on the opposite side from the oronasal face cover so as to hold the oronasal face cover on the face of the user when the harness is in the retracted state, and
   in the storage position, the harness is in the retracted state.

3. Assembly according to claim 2, wherein:
   the platform extends along a longitudinal axis between a connecting end and a free end, and is connected to the base at the connecting end, the receiving surface extending around the longitudinal axis, and
   the respiratory mask is releasable from the storage device when the harness is in the deployed state, by movement away from the platform on the side opposite from the connecting end.

4. Assembly according to claim 3, wherein the platform has a generally cylindrical shape extending around the longitudinal axis.

5. Assembly according to claim 2, wherein the platform has a groove on its peripheral receiving surface which receives the harness in the storage position.

6. Assembly according to claim 1, wherein the platform has the general shape of a human head.

7. Assembly according to claim 1, wherein the platform is extendable between a first state where the platform is holding the harness and a second state where the platform releases the harness, and the respiratory mask is releasable from the storage device when the platform is in the retracted state.

8. Assembly according to claim 7, wherein the platform has an inflatable casing.

9. Assembly according to claim 1, wherein:
   the base has a housing, and
   when the respiratory mask is in the storage position and the platform is in the retracted position, the platform and respiratory mask are at least partially housed in the housing.

10. Assembly according to claim 9, wherein, when the respiratory mask is in the storage position and the platform is in the retracted position, the major portion of the platform is inserted into the housing.

11. Assembly according to claim 1, wherein the oronasal face cover has a peripheral edge and the receiving surface of the platform has a protrusion, and wherein the peripheral edge of the oronasal face cover is suitable for engaging with the protrusion of the receiving surface when the respiratory mask is in the storage position.

12. Assembly according to claim 1, wherein the harness comprises an elastic tubular device having an elongate internal cavity, and the elastic tubular device is adapted to elongate according to the pressure in the internal cavity of the elastic tubular device so as to enable the crew member to insert his head into the loop formed by the harness when the harness is in the deployed state.

13. Assembly according to claim 1, wherein the platform is mounted on the base so as to rotate between the retracted position and the extended position.

14. Assembly according to claim 13, wherein the platform pivots between 45 and 135 degrees between the retracted position and the extended position relative to the base.

15. Assembly according to claim 1, wherein the platform is urged towards the extended position by gravity.

16. Assembly according to claim 1, wherein the platform is held in the retracted position by a retaining device.

17. Assembly according to claim 16, wherein the retaining device holding the platform in the retracted position is a device operating by magnetic attraction.

18. Assembly according to claim 17, wherein the retaining device operating by magnetic attraction comprises a retaining magnet and a magnetizable or magnetic element, the magnetizable or magnetic element being in immediate proximity to the retaining magnet in the retracted position, one among the retaining magnet and the magnetizable or magnetic element being bonded to the base and the other among the retaining magnet and the magnetizable or magnetic element being bonded to the platform.

19. Assembly according to claim 18, wherein the retaining magnet is an electromagnet.

20. Assembly according to claim 16, wherein the retaining device comprises an abutment the abutment holding the platform in the retracted position.

21. Aircraft cockpit comprising a seat and an assembly according to claim 1, wherein the assembly is arranged substantially above the seat but laterally offset relative to the seat by 25 centimeters to 75 centimeters.

22. Method for storing an assembly intended to be arranged in a cockpit of an aircraft having a pressurized cabin in order to supply breathing gas to a crew member, said assembly comprising a respiratory mask and a storage device, the respiratory mask comprising a harness forming a loop adapted to be extended around the head of the user, the storage device comprising a base and a storage platform, the platform being mounted so as to be movable relative to the base between a retracted position and an extended position, wherein in said method:
   a) the platform is placed in the extended position,
   b) the respiratory mask is brought to a storage position against a receiving surface of the platform while positioning the loop of the harness around the platform, on a side opposite from the oronasal face cover,
   c) the oronasal face cover is held against the receiving surface of the platform while snugly fitting the harness on the platform, then,
   d) the platform is moved to the retracted position.

23. Method for storing according to claim 22, wherein the harness is expandable and has a deployed state and a retracted state, and prior to step c) the harness is brought to the deployed state.

24. Method for storing according to claim 23, wherein, during step c), the harness is brought to the retracted state.

25. Method for storing according to claim 22, wherein the platform is extendable between a first state where the platform is holding the harness and a second state where the platform releases the harness, and prior to step c) the platform is brought to the second state.

26. Method for storing according to claim 25, wherein, during step c), the platform is in the first state.

27. Method for storing according to claim 22, wherein the platform extends along a longitudinal axis between a connecting end and a free end, and is connected to the base at the connecting end, and during step b) the harness is moved relative to the platform towards the connecting end in order to position the loop of the harness around the platform.

28. Method for the use of an assembly intended to be arranged in a cockpit of an aircraft having a pressurized cabin in order to provide a breathing gas to a crew member, said assembly comprising a respiratory mask and a storage device, the respiratory mask comprising a harness forming a loop adapted to be extended around the head of the user, the storage device comprising a base and a storage platform, the platform being mounted so as to be movable relative to the base between a retracted position and an extended position, wherein in said method:
   a) the respiratory mask being in a storage position against a receiving surface of the platform, the loop of the harness extending around the platform on a side opposite from the oronasal face cover, the platform is moved from the retracted position to the extended position,
   b) the oronasal face cover is held against the receiving surface of the platform, then
   c) the respiratory mask is released from the storage device.

29. Method for use according to claim 28, wherein the harness is expandable and has a deployed state and a retracted state, and prior to step a) the harness is brought to the retracted state.

30. Method for use according to claim 29, wherein, during step c), the harness is brought to the deployed state.

31. Method for use according to claim 28, wherein the platform is extendable between a first state where the platform is holding the harness and a second state where the platform releases the harness, and prior to step a) the platform is brought to the second state.

32. Method for use according to claim 31, wherein, during step c), the platform is in the first state.

33. Method for storage according to claim 28, wherein the platform extends along a longitudinal axis between a connecting end and a free end and is connected to the base at the connecting end, and during step c) the harness is moved away from the platform on an side opposite from the connecting end in order to release the respiratory mask from the platform.

* * * * *